(12) United States Patent
Dannenmann et al.

(10) Patent No.: US 12,502,706 B2
(45) Date of Patent: Dec. 23, 2025

(54) FOUNDRY COMPONENT HAVING AN ANTICORROSION LAYER STRUCTURE

(71) Applicant: Oskar Frech GmbH + Co. KG, Schorndorf (DE)

(72) Inventors: Helmar Dannenmann, Schorndorf (DE); Alexander Baesgen, Aalen (DE)

(73) Assignee: Oskar Frech GmbH + Co. KG, Schorndorf (DE)

( * ) Notice: Subject to any disclaimer, the term of this patent is extended or adjusted under 35 U.S.C. 154(b) by 291 days.

(21) Appl. No.: 17/459,008

(22) Filed: Aug. 27, 2021

(65) Prior Publication Data

US 2022/0062980 A1 Mar. 3, 2022

(30) Foreign Application Priority Data

Aug. 28, 2020 (DE) ...................... 10 2020 210 913.3

(51) Int. Cl.
*B22D 17/20* (2006.01)
*B32B 5/26* (2006.01)
(Continued)

(52) U.S. Cl.
CPC .............. *B22D 17/20* (2013.01); *B32B 5/275* (2021.05); *B32B 15/14* (2013.01); *B32B 15/18* (2013.01);
(Continued)

(58) Field of Classification Search
CPC .. B22C 1/04; B22C 3/00; B22D 7/068; B22D 41/02
(Continued)

(56) References Cited

U.S. PATENT DOCUMENTS 2,882,568 A * 4/1959 Leaberry ................. B22C 23/02
428/428
3,352,465 A * 11/1967 Shapland .................. C21C 7/10
266/236
(Continued)

FOREIGN PATENT DOCUMENTS

CN 1939617 A 4/2007
CN 102941327 A 2/2013
(Continued)

OTHER PUBLICATIONS

Resco Products Inc., Basic Information of Types of Refractory Products, accessed Aug. 22, 2024, pp. 1-3 (Year: 2024).*
(Continued)

*Primary Examiner* — Seth Dumbris
(74) *Attorney, Agent, or Firm* — Crowell & Moring LLP

(57) ABSTRACT

A foundry component for an apparatus for casting or handling a metal melt includes a metallic main body which is provided in a melt-contact surface region with an anticorrosion layer structure composed of one or more superposed layers. The anticorrosion layer structure has, as a sole layer or as one of a plurality of layers, a protective woven fabric body prefabricated as flexible woven fabric body from a woven fabric material which is casting temperature resistant or a nonwoven protective layer prefabricated as pliable nonwoven layer from a fiber nonwoven material or fiber paper material which is casting temperature resistant or a protective shaped body prefabricated as rigid shaped body from a material which is casting temperature resistant.

20 Claims, 1 Drawing Sheet

(51) Int. Cl.
  *B32B 15/14* (2006.01)
  *B32B 15/18* (2006.01)
  *D03D 15/242* (2021.01)
  *D03D 27/00* (2006.01)
  *D04H 1/4209* (2012.01)
  *D04H 11/00* (2006.01)
  *B32B 1/00* (2006.01)

(52) U.S. Cl.
  CPC ............ *D03D 15/242* (2021.01); *D03D 27/00* (2013.01); *D04H 1/4209* (2013.01); *D04H 11/00* (2013.01); *B32B 1/00* (2013.01); *B32B 2262/105* (2013.01); *B32B 2307/714* (2013.01); *D10B 2101/08* (2013.01)

(58) Field of Classification Search
  USPC .... 164/138, 23, 519, 33, 524; 266/280, 283, 266/270, 286
  See application file for complete search history.

(56) References Cited

U.S. PATENT DOCUMENTS

| | | | |
|---|---|---|---|
| 4,029,000 A | 6/1977 | Nakamura et al. | |
| 4,122,642 A | 10/1978 | Buchy | |
| 4,250,946 A * | 2/1981 | Monta | B22D 7/062 |
| | | | 164/137 |
| 4,556,098 A | 12/1985 | Hintermann et al. | |
| 4,704,079 A * | 11/1987 | Pluim, Jr. | B29C 45/37 |
| | | | 425/557 |
| 4,729,497 A * | 3/1988 | Fricker | B22D 41/42 |
| | | | 266/271 |
| 4,783,057 A * | 11/1988 | Sullins | F27D 3/18 |
| | | | 75/533 |
| 4,799,531 A * | 1/1989 | Yamamoto | B22D 17/30 |
| | | | 164/113 |
| 5,415,219 A * | 5/1995 | Wiedenmann | B22D 25/04 |
| | | | 249/80 |
| 6,051,058 A | 4/2000 | Crisci et al. | |
| 6,395,396 B1 | 5/2002 | Hanse | |
| 6,447,893 B2 | 9/2002 | Hanzawa et al. | |
| 6,616,782 B2 | 9/2003 | Hanse | |
| 7,059,383 B1 * | 6/2006 | Tremblay | B22D 7/08 |
| | | | 164/439 |
| 8,292,998 B2 | 10/2012 | Laudenklos | |
| 8,662,143 B1 * | 3/2014 | Foster | B22D 7/06 |
| | | | 164/340 |
| 10,766,064 B2 | 9/2020 | Erhard et al. | |
| 2002/0006506 A1 | 1/2002 | Hanzawa et al. | |
| 2002/0117253 A1 | 8/2002 | Hanse | |
| 2002/0130450 A1 | 9/2002 | Kinosz et al. | |
| 2006/0213634 A1 * | 9/2006 | Kaba | B22D 17/2023 |
| | | | 164/113 |
| 2007/0054057 A1 | 3/2007 | Matje et al. | |
| 2007/0068649 A1 | 3/2007 | Verner et al. | |
| 2008/0011787 A1 * | 1/2008 | Kennedy | B22D 18/04 |
| | | | 266/239 |
| 2009/0220772 A1 | 9/2009 | Laudenklos | |
| 2011/0139799 A1 | 6/2011 | Boorman et al. | |
| 2011/0247535 A1 * | 10/2011 | Lee | F27D 1/0006 |
| | | | 110/338 |
| 2014/0193635 A1 | 7/2014 | Erhard et al. | |
| 2016/0263652 A1 | 9/2016 | Boorman et al. | |
| 2017/0029341 A1 * | 2/2017 | Vincent | C04B 35/66 |

FOREIGN PATENT DOCUMENTS

| | | | |
|---|---|---|---|
| CN | 103930597 A | 7/2014 | |
| CN | 104128572 A | 11/2014 | |
| DE | 2 242 837 B | 9/1973 | |
| DE | 23 64 809 B2 | 8/1974 | |
| DE | 29521507 U1 * | 5/1997 | ............ F16L 49/04 |
| DE | 197 13 396 C1 | 7/1998 | |
| DE | 699 02 897 T2 | 5/2003 | |
| DE | 10 2006 040 385 A1 | 1/2007 | |
| DE | 10 2005 042 473 A1 | 3/2007 | |
| DE | 698 37 677 T2 | 1/2008 | |
| DE | 10 2011 078 066 A1 | 12/2012 | |
| DE | 10 2013 104 416 B4 | 6/2017 | |
| DE | 10 2016 100 810 A1 | 7/2017 | |
| DE | 20 2010 018 517 U1 | 7/2017 | |
| DE | 10 2019 116 989 A1 | 12/2020 | |
| EP | 1086936 A2 * | 3/2001 | ............ B22D 41/02 |
| EP | 1 236 525 A2 | 9/2002 | |
| EP | 1312884 A2 * | 5/2003 | ........... F27D 3/1509 |
| EP | 1 486 473 A1 | 12/2004 | |
| EP | 2 723 916 B1 | 1/2019 | |
| GB | 1 393 816 | 5/1975 | |
| JP | 61-222939 A | 10/1986 | |
| JP | 5-104239 A | 4/1993 | |
| JP | 06007918 A * | 1/1994 | |
| JP | 6-142883 A | 5/1994 | |
| JP | 7-88626 A | 4/1995 | |
| JP | 8-325086 A | 12/1996 | |
| JP | 11245005 A * | 9/1999 | |
| JP | 2001-158659 A | 6/2001 | |
| JP | 2004-85432 A | 3/2004 | |
| JP | WO2014050892 A1 * | 4/2014 | |
| TW | 373030 B | 11/1999 | |
| TW | 488970 B | 6/2002 | |
| WO | WO-2011011470 A1 * | 1/2011 | ............... B22C 1/18 |
| WO | WO 2013/180219 A1 | 12/2013 | |

OTHER PUBLICATIONS

German-language European Search Report issued in European Application No. 21187349.2 dated Oct. 18, 2021 with partial English translation (10 pages).

German-language European Office Action issued in European Application No. 21 187 349.2 dated Dec. 15, 2022 (six (6) pages).

German-language Office Action issued in German Application No. 10 2020 210 913.3 dated Mar. 24, 2021 (five (5) pages).

Chinese-language Office Action issued in Chinese Application No. 202110994703.0 dated Feb. 5, 2025 (6 pages).

Chinese-language Office Action issued in Taiwanese Application No. 110131108 dated Apr. 10, 2025 with English translation (17 pages).

Japanese-language Office Action issued in Japanese Application No. 2021-138725 dated Apr. 15, 2025 with English translation (13 pages).

\* cited by examiner

FOUNDRY COMPONENT HAVING AN ANTICORROSION LAYER STRUCTURE

CROSS REFERENCE TO RELATED APPLICATION

This application claims priority under 35 U.S.C. § 119 from German Patent Application No. 102020210913.3, filed Aug. 28, 2020, the entire disclosure of which is herein expressly incorporated by reference.

BACKGROUND AND SUMMARY OF THE INVENTION

The invention relates to a foundry component for an apparatus for casting or handling a metal melt, wherein the component comprises a metallic main body which is provided in a melt-contact surface region with an anticorrosion layer structure composed of one or more superposed layers.

Such foundry components are employed in metal casting technology, e.g. for hot chamber pressure casting machines and cold chamber pressure casting machines, in a variety of forms, for example as casting fittings, casting vessels, melt furnaces, melt transport units and casting moulds and also parts of these metal casting components. An iron-based material, i.e. a material based on iron, typically a steel material such as a cast steel material, is usually employed for the main body since such components have a good cost/utility ratio. For the present purposes, the melt-contact surface region is understood to mean the region of the surface of the main body of the foundry component which during casting operation is exposed continuously or at least for some of the time to the metal melt, i.e. comes into contact with the latter.

It has been found that foundry components having a main body composed of steel can be chemically attacked by the liquid metal melt, i.e. are subject to corrosion, in this melt-contact surface region, i.e. in regions in which the components come into contact with the hot metal melt during casting operation. Thus, for example, a noticeable corrosive attack by aluminium melts in aluminium pressure casting is observed on steel surfaces of foundry components which come into contact with these melts.

A known remedy for casting piston/casting cylinder units of metal pressure casting machines is to make the casting piston and the casting cylinder entirely of a ceramic material or of a sintered material, e.g. of sintered titanium diboride ($TiB_2$). However, the mechanical strength, heat resistance and impact strength often remained unsatisfactory.

In a similar way, the laid-open publication DE 2 364 809 proposes making the casting piston and the casting cylinder as assembled sintered component of a mixture of two or more materials from the group consisting of carbides, borides and nitrides. In particular, a specific mixture of boron carbide ($B_4C$) with one or more of $TiB_2$, zirconium diboride ($ZiB_2$) and boron nitride (BN) is indicated.

In patent publication U.S. Pat. No. 4,556,098, this and other sintered materials examined are said still to be unsatisfactory, and a hot-pressed, ultrahard silicon nitride or Sialon material having a high density is proposed as an alternative for the casting cylinder and the casting piston. For a crucible made of cast iron, an anticorrosion coating to protect against corrosion and oxidation which is composed of Ca, $Al_2O_3$ or other oxides such as $Al_2O_3$—$TiO_2$ or of $TiB_2$, $ZaB_2$, $CaB_2$ or other pure or mixed borides or of AlN, $Si_3N_4$, BN, Sialons or other nitrides is disclosed and is, for example, applied from an emulsion or by flame spraying. For conical plugs for closing accessibility holes for the riser channel and other parts of a casting fitting, manufacture also from such corrosion- and erosion-resistant materials is proposed. For parts of the casting mould which are exposed to the metal melt only at relatively low temperatures, a coating composed of a dense material comprising $Si_3N_4$, AlN, Sialon, BN, graphite or pyrolytic carbon or alloys thereof is proposed.

Patent publication EP 2 723 916 B1 discloses a foundry component of the abovementioned type, in which the anticorrosion layer structure is formed by an anticorrosion layer configured as a sol-gel layer using microparticles and/or nanoparticles having an average particle size in the range from 50 nm to 50 µm of one or more substances as filler, which substances are selected from the group consisting of borides and carbides of the transition metals and alloys thereof and also of boron and silicon, where the sol-gel layer comprises a zirconium-based or silicon-based gel former and is formed by a plurality of gel sublayers of which at least one sublayer is free of microparticles and/or nanoparticles and forms an outer sublayer of the sol-gel layer.

The invention addresses the technical problem of providing a foundry component of the abovementioned type, where the foundry component can be produced with a relatively small outlay and displays high corrosion resistance to liquid metal casting melts, in particular aluminium melts.

The invention solves this problem by providing a foundry component for an apparatus for casting or handling a metal melt, said foundry component comprising a metallic main body which is provided in a melt-contact surface region with an anticorrosion layer structure composed of one or more superposed layers. The anticorrosion layer structure comprises, as single layer in the case of a one-ply configuration or as one of a plurality of layers in the case of a multi-ply configuration, a protective woven fabric body prefabricated as flexible woven fabric body from a woven fabric material which is casting temperature resistant or a nonwoven protective layer as pliable nonwoven layer prefabricated from a fiber nonwoven material or fiber paper material which is casting temperature resistant or a protective shaped body as rigid shaped body prefabricated from a shaped body material which is casting temperature resistant.

The fiber nonwoven material or the fiber paper material for the nonwoven protective layer consists of comparatively short fibers, while the flexible woven fabric body for the protective woven fabric body is formed by long fibers having a comparatively high tensile strength. In both cases, fiber or woven fabric materials which are stable at the casting temperature, as are known per se for foundry applications, e.g. for aluminium casting, are used for this purpose. As fiber nonwoven material, it is possible to use, in particular, conventional nonwoven materials offered on the market under the name ceramic nonwoven. As fiber paper material, it is possible to use, in particular, conventional paper materials offered on the market under the name ceramic paper; for the present purposes, the term nonwoven layer or nonwoven protective layer encompasses, in the interests of simplicity, both the corresponding layers of the ceramic nonwoven material and the corresponding layers of the ceramic paper material, which can be used optionally or interchangeably here.

When using the protective woven fabric body, this is preferably applied as tailored coating on the melt-contact surface region. It can then lie tightly against the melt-contact surface region of the main body under the liquid pressure of the melt material, with any included air being displaced.

During operation of the foundry component, the protective woven fabric body prevents intrusion of the melt material through to the metallic main body and experiences a sintering process due to contact with the hot melt material over the course of use, e.g. after some days or weeks, as a result of which it is transformed from the flexible prefabricated woven fabric body to a brittle woven fabric body.

In a manner analogous to the case of the flexible prefabricated protective woven fabric body, the nonwoven protective layer prefabricated as pliable nonwoven layer is also able to function as inert barrier to the metal melt and in this way protect the metallic main body against corrosion by the metal melt.

When using the protective shaped body, this forms a lining which is impermeable from the outside inward for the melt-contact surface region of the main body of the foundry component and can, in particular, be prefabricated as tailored, one-piece, rigid shaped body or as a shaped body made up of a plurality of rigid plate elements, with in the latter case the plate elements being prefabricated and being able to be arranged individually on the melt-contact surface region of the main body of the foundry component or, as an alternative, be assembled to form a shaped body and then be arranged together as such shaped body on the melt-contact surface region. Any joins or transition regions laterally between neighbouring plate elements can, if required, be closed by a heat-resistant ceramic adhesive material. For this purpose, it is once again possible to use sufficiently heat-resistant ceramic adhesive materials which are casting temperature resistant, i.e. to the typical operating temperatures at which casting is carried out, in particular ceramic adhesive materials which are resistant to high temperatures, as are well known for this purpose to a person skilled in the art, e.g. materials based on aluminium oxide.

The expression casting temperature resistant here indicates, as the term suggests, resistance of the material concerned to the casting temperatures to which the material is exposed during casting operation. The casting temperatures naturally depend on the melt material to be cast in each case; since the latter are metal melts, these are generally very high temperatures of above 500° C. to far above 1000° C. The correspondingly high-temperature-resistant material has to be sufficiently physically and chemically resistant at these temperatures, even during prolonged operational use. Such materials for use in the particular casting temperature range are known per se to a person skilled in the art, so that no further explanations are necessary at this juncture. Such mould materials which are casting temperature resistant, including in the present case, in the interests of simplicity, corresponding plate materials are known to a person skilled in the art, e.g. from furnace construction.

In the case of the multi-ply configuration, the one or more further layers can, if required, serve to give improved bonding of the anticorrosion layer structure to the surface of the main body and/or to provide a further inert barrier to protect the main body against corrosion by the metal melt.

It has been found that the metallic main body of the foundry component of the invention can be protected very reliably against corrosion phenomena, as could otherwise be caused by contact with the melt material, in its melt-contact surface region in which it can come into contact during operation with the metallic melt material used for casting, e.g. aluminium or an aluminium alloy or another nonferrous metal, by this one-ply anticorrosion layer structure, i.e. layer structure consisting of a single layer, or multi-ply anticorrosion layer structure, i.e. layer structure consisting of a plurality of superposed layers.

In the case of the anticorrosion layer structure according to the invention, there is no adhesive bonding or full-area positive locking of this to the metallic main body to be protected. This makes the anticorrosion layer structure less sensitive to mechanical damage compared to conventional adhesively bonded or positively locked coatings, and any damage can also remain locally limited to a greater extent. In addition, the anticorrosion layer structure therefore has a significantly better thermal expansion tolerance, i.e. the occurrence of mechanical stresses in the anticorrosion layer structure caused by thermal expansion effects of the metallic main body can be avoided or in any case significantly reduced compared to conventional adhesively bonded or positively locked coatings.

At the same time, this anticorrosion layer structure can be realised with a comparatively small outlay. For this purpose, the protective woven fabric body and/or the nonwoven protective layer and/or the protective shaped body composed of the corresponding woven fabric material, the fiber nonwoven/fiber paper material or the rigid plate/shaped body material in prefabricated form is applied to the melt-contact surface region of the main body of the foundry component which is to be protected.

Here, it is found that the anticorrosion layer structure comprising the protective woven fabric body or nonwoven protective layer or the protective shaped body is able to give very long-term corrosion protection over many weeks of operation, in particular also for foundry components whose main body consists of a steel material. The corrosion protection is maintained reliably for long periods of use even when the melt-contact surface region of the main body is continually in contact with the melt material of the metal being cast. A longer operating life of the foundry component protected in this way against corrosive influences by the melt material is obtained.

In addition, this realisation of the anticorrosion layer structure allows, when required, relatively uncomplicated renovation and thus subsequent renewed operational use of the foundry component. For this purpose, the layer in the form of the protective woven fabric body or the nonwoven layer or the protective shaped body can be removed relatively easily, which is generally not possible in the case of conventional protective coatings which have been deposited by thin-layer technology on the metallic main body of the foundry component. Likewise, any further, optional layers of the anticorrosion layer structure can be removed again from the metallic main body if necessary in the present case. The metallic main body of the foundry component can subsequently be provided again with a fresh anticorrosion layer structure in its melt-contact surface region.

It goes without saying that, if required, one or more further layers which do not have an anticorrosion function can be provided outside on the outermost layer of the anticorrosion layer structure and/or internally between the surface of the main body and the innermost layer of the anticorrosion layer structure and/or between two layers of the anticorrosion layer structure.

Advantageous developments of the invention, which contribute to achieving the above-mentioned and further objects, are set forth in the dependent claims, the content of which, including all combinations of features indicated by the claim back-references, is hereby fully incorporated by reference into the description.

In corresponding developments of the invention, the woven fabric material which is casting temperature resistant is a material based on aluminium oxide ($Al_2O_3$) and/or the fiber nonwoven or fiber paper material which is casting temperature resistant is a material based on $Al_2O_3$ and/or the shaped body material which is casting temperature resistant is a material based on $Al_2O_3$. The components produced therefrom are accordingly also referred to as $Al_2O_3$ protective woven fabric body, $Al_2O_3$ nonwoven protective layer or $Al_2O_3$ protective shaped body in the present case. It has been found that this selection of material is particularly advantageous in respect of both the physical and chemical resistance at the prevailing casting temperatures and also in respect of technical and economic feasibility, including for applications in aluminium casting. It goes without saying that such materials based on $Al_2O_3$ generally do not need to consist exclusively of $Al_2O_3$ but rather can contain additional materials in subordinate amounts.

In a development of the invention, the anticorrosion layer structure is a multi-ply structure and comprises at least one further layer which differs from the first-mentioned layer and is selected from the group consisting of the protective woven fabric body, the nonwoven protective layer, the protective shaped body and a heat-resistant ceramic adhesive layer. This multi-ply configuration can particularly effectively improve, where necessary, the bonding of the anticorrosion layer structure to the surface of the main body and/or provide at least one further inert barrier layer to protect the main body against corrosion by the metal melt. For the heat-resistant ceramic adhesive layer, it is possible to use ceramic adhesive materials which are sufficiently heat-resistant at the typical casting temperatures, as will be familiar to a person skilled in the art for this purpose, including those based on $Al_2O_3$. In alternative, one-ply configurations, the anticorrosion layer structure does without such a further layer and consists only of the first-mentioned layer and optionally one or more layers of a different type.

In an embodiment of the invention, the anticorrosion layer structure is multi-ply with the ceramic adhesive layer as an innermost layer, i.e. layer adjoining the main body. The ceramic adhesive layer can in appropriate applications improve the bonding of the anticorrosion layer structure to the melt-contact surface region of the main body. In alternative embodiments, the anticorrosion layer structure does without such an innermost ceramic adhesive layer.

In an embodiment of the invention, the anticorrosion layer structure is multi-ply and has the protective woven fabric body as an outer layer and the nonwoven protective layer as an inner layer. This means that the nonwoven protective layer is arranged closer to the main body than is the protective woven fabric body, without the nonwoven protective layer necessarily having to be an innermost layer and/or the protective woven fabric body necessarily having to be an outer layer of the layer structure and without the nonwoven protective layer and the protective woven fabric body necessarily having to be two directly adjoining layers of the layer structure. This combines the advantageous anticorrosion properties and other chemical and physical properties of the protective woven fabric body and the nonwoven protective layer in a favorable way, with the protective woven fabric body as outer layer being able to protect the inner nonwoven protective layer against mechanical effects such as impacts and the like. In an advantageous embodiment, the ceramic adhesive layer is present as innermost layer of the anticorrosion layer structure between the nonwoven protective layer and the metallic main body of the foundry component, which can improve the bonding of the anticorrosion layer structure and in this case especially that at the melt-contact surface region of the main body.

In an embodiment of the invention, the anticorrosion layer structure is at least three-ply and has the ceramic adhesive layer as an innermost layer, the protective shaped body as an outer layer and the nonwoven protective layer as an intermediate layer between the ceramic adhesive layer and the protective shaped body. This embodiment combines the advantageous properties of the impermeable outer protective shaped body with the advantages of the ceramic adhesive layer in respect of good bonding of the anticorrosion layer structure to the melt-contact surface region of the main body of the foundry component and the advantages of the intermediate nonwoven protective layer, including the thickness equalization capability and yielding nature under compressive stresses. In alternative embodiments, the intermediate nonwoven protective layer or the inner ceramic adhesive layer is absent.

In an embodiment of the invention, the ceramic adhesive layer consists of a heat-resistant, in particular high-temperature-resistant, ceramic adhesive material based on $Al_2O_3$. This represents a choice of the material for the ceramic adhesive layer which is particularly favorable for the present purposes. Alternatively a ceramic adhesive layer composed of a different heat-resistant ceramic adhesive material can be used.

In a development of the invention, the protective woven fabric body has a thickness in the range from 0.8 mm to 3 mm. This thickness range has been found to be optimal for the protective woven fabric body in respect of realisation outlay, satisfactory corrosion protection and a very limited permanent increase in the dimensions of the foundry component due to the anticorrosion layer structure. For specific applications, the thickness of the $Al_2O_3$ protective woven fabric body can be selected outside this range.

In a development of the invention, the nonwoven protective layer has a thickness in the range from 0.5 mm to 5 mm. This thickness range has been found to be optimal for the nonwoven protective layer in respect of realisation outlay, satisfactory corrosion protection and a very limited permanent increase in the dimensions of the foundry component due to the anticorrosion layer structure. For specific applications, the thickness of the nonwoven protective layer can be selected outside this range.

In a development of the invention, the protective shaped body has a thickness in the range from 2 mm to 25 mm. This thickness range has been found to be optimal for the protective shaped body in respect of realisation outlay, satisfactory corrosion protection and a very limited permanent increase in the dimensions of the foundry component due to the anticorrosion layer structure. For specific applications, the thickness of the protective shaped body can be selected outside this range.

In a development of the invention, the main body consists of an iron-based material, in particular a cast steel material. This combines the advantage of the present anticorrosion layer structure with the advantages known per se of selecting an iron-based material for the metallic main body of the foundry component. As an alternative, the main body of the foundry component can be made of another metal material.

In a development of the invention, the foundry component can be a component for a metal pressure casting machine, e.g. a hot chamber pressure casting machine. In particular, it can be a casting fitting, a casting vessel, a melt furnace component, a melt transport component, a casting mould component or a part of these components of the metal pressure casting machine which come into contact with the melt. Due to its specific anticorrosion layer structure, the foundry component has excellent suitability for these purposes in particular and a comparatively long useful life.

Advantageous embodiments of the invention are depicted in the drawings. These and further embodiments of the invention will be explained in more detail below.

DETAILED DESCRIPTION OF THE DRAWINGS

Figure 1:
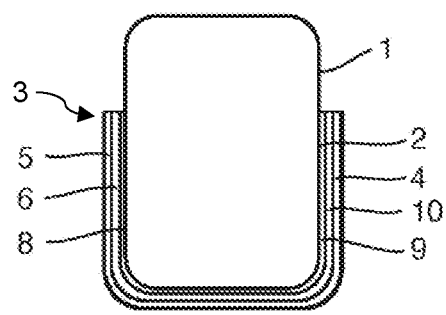
FIG. 1 is a schematic sectional view of a foundry component with a partial outer, three-ply anticorrosion layer structure.
Figure 3:
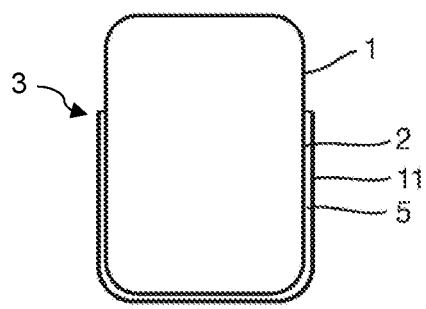
FIG. 3 is the sectional depiction of FIG. 1 for a variant having a one-ply instead of three-ply anticorrosion layer structure.
Figure 4:
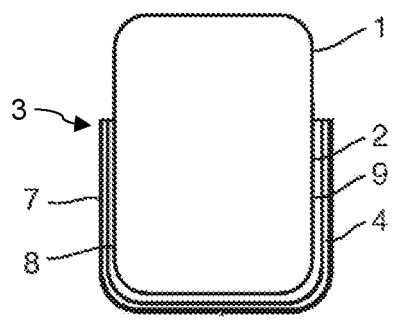
FIG. 4 is the sectional depiction of FIG. 1 for a variant having a two-ply instead of three-ply anticorrosion layer structure.

FIGS. 1, 3 and 4 show, purely schematically with the constituents thereof which are of interest here, a foundry component for an apparatus for casting or handling a metal melt, which comprises a metallic main body 1 which is provided in a melt-contact surface region 2 with an anticorrosion layer structure 3. FIGS. 1, 3 and 4 show by way of example and as representative of further possible realisations, various realisation examples for the anticorrosion layer structure 3.

In the embodiment shown in FIG. 1, the anticorrosion layer structure 3 comprises a protective woven fabric body 5 prefabricated as flexible woven fabric body from a woven fabric material which is casting temperature resistant as an outermost layer 4, i.e. layer 4 facing away from the surface of the metallic main body 1. Furthermore, the anticorrosion layer structure 3 in the working example of FIG. 1 comprises a ceramic adhesive layer 8 which is casting temperature resistant as an innermost layer 9, and a nonwoven protective layer 6 prefabricated as pliable nonwoven layer from a fiber nonwoven or fiber paper material which is casting temperature resistant as an intermediate layer 10 of the thus three-ply layer structure, i.e. layer structure comprising three layers.

The protective woven fabric body 5 is, in an advantageous realisation, prefabricated from a woven fabric material based on $Al_2O_3$ which is casting temperature resistant, i.e. it in this case forms an $Al_2O_3$ protective woven fabric body. The nonwoven protective layer 6 is, in an advantageous realisation, prefabricated from a fiber nonwoven or fiber paper material based on $Al_2O_3$ which is casting temperature resistant, i.e. it in this case forms an $Al_2O_3$ nonwoven protective layer. In alternative realisations, other materials which are casting temperature resistant are used for the layer structure components concerned, e.g. materials based on zirconium oxide or oxide-ceramic composite materials including fiber-reinforced composite materials as are known per se to a person skilled in the art for use in casting technology and other high-temperature applications. The nonwoven protective layer 6 preferably has a thickness in the range from 0.5 mm to 5 mm. The fiber nonwoven or fiber paper material for the nonwoven protective layer 6 consists of fibers which are shorter than fibers which have a high tensile strength and of which the flexible woven fabric body for the protective woven fabric body 5 is made.

Figure 2:
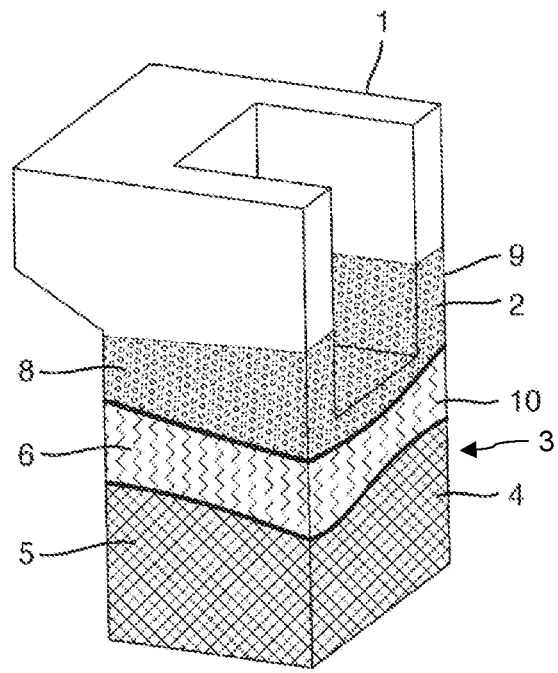
FIG. 2 is a schematic sectional view of a casting vessel as foundry component with the partial outer anticorrosion layer structure of FIG. 1.

FIG. 2 specifically shows a case in which the foundry component having the anticorrosion layer structure 3 in the realisation of FIG. 1 is a casting vessel as is customary, for example, in a metal pressure casting machine and more specifically in a hot chamber pressure casting machine for the casting of aluminium or aluminium alloys or other nonferrous casting metals. The casting vessel of FIG. 2 is of a construction known per se, as is disclosed, for example, in the above-mentioned patent publication EP 2 723 916 B1. In alternative embodiments, the foundry component forms a casting fitting, a casting vessel, a melt furnace component, a melt transport component, a casting mould component or a part of one of these pressure casting machine components. To give a better picture of the layer sequence of the anticorrosion layer structure 3 in this illustrative case, the participating layers are shown cut to different heights of the casting vessel, so that each layer can be seen at least in regions.

In alternative embodiments, only the ceramic adhesive layer 8 or only the nonwoven protective layer 6 is provided as innermost layer 9 between the metallic main body 1 and the protective woven fabric body 5 as outermost layer 4 in a two-ply configuration of the anticorrosion layer structure 3.

In the embodiment shown in FIG. 3, the anticorrosion layer structure 3 is one-ply, i.e. it consists only of a single protective layer 11 which in this example is formed by the protective woven fabric body 5. The protective woven fabric body or $Al_2O_3$ protective woven fabric body 5 here and in other multilayer realisations of the anticorrosion layer structure 3 in which it is used preferably has a thickness in the range from 0.8 mm to 3 mm. In an alternative embodiment, the single layer 11 of the anticorrosion layer structure 3 in a one-ply configuration consists of the nonwoven protective layer or $Al_2O_3$ nonwoven protective layer 6. Restricted to relatively small surface regions or transition regions, the ceramic adhesive layer 8 can also be used as one-layer adhesive coating for the anticorrosion layer structure 3.

In the embodiment shown in FIG. 4, the anticorrosion layer structure 3 is two-ply with the ceramic adhesive layer 8 as inner or innermost layer 9 and a protective shaped body 7 prefabricated as rigid shaped body from a shaped body material which is casting temperature resistant as outer or outermost layer 4. The protective shaped body 7 is, in an advantageous realisation, prefabricated from a shaped body material based on $Al_2O_3$ which is casting temperature resistant, i.e. it in this case forms an $Al_2O_3$ protective shaped body. In alternative realisations, other materials which are casting temperature resistant are used for the protective shaped body, e.g. once again materials based on zirconium oxide or oxide-ceramic composite materials including fiber-reinforced composite materials.

In alternative embodiments, the anticorrosion layer structure 3 is three-ply, i.e. comprises three layers, with the protective shaped body 7 as the outermost layer 4, the ceramic adhesive layer 8 as the innermost layer 9 and the nonwoven protective layer 6 or the protective woven fabric body 5 as intermediate layer between the ceramic adhesive layer 8 and the protective shaped body 7.

When the nonwoven protective layer 6 is used as intermediate layer 10 in the corresponding cases of an at least three-ply configuration of the anticorrosion layer structure 3, this can serve as further inert barrier against the melt material and thereby reliably protect the metallic main body 1 against corrosion even when the outer protective woven fabric body 5 or the outer protective shaped body 7 has been damaged or penetrated.

An analogous additional security against corrosion is offered by the other possible multi-ply embodiments of the anticorrosion layer structure 3. In these multilayer embodiments of the anticorrosion layer structure 3, it is extremely improbable that the metal melt can come into direct contact with the metallic main body 1 as a result of, for example, mechanical damage to one of the plurality of layers, in particular the outermost layer 4, since one or more further layers of the anticorrosion layer structure 3 still remain and can take on the anticorrosion function at the local point of damage of the damaged layer.

In further alternative embodiments, the anticorrosion layer structure 3 comprises four or more superposed layers, each of which is selected from the group consisting of the layer provided by the protective woven fabric body 5, the layer provided by the nonwoven protective layer 6, the layer provided by the protective shaped body 7 and the layer provided by the ceramic adhesive layer 8 and of which at least two are different from one another.

The ceramic adhesive layer 8 preferably consists of a heat-resistant ceramic adhesive material based on $Al_2O_3$, for which purpose it is possible to use a corresponding conventional ceramic adhesive material of this type. The ceramic adhesive layer 8 can, depending on requirements, be applied over part or the full area of the metallic main body 1 in the melt-contact surface region 2 thereof. The ceramic adhesive material of the ceramic adhesive layer 8 preferably has, when used with the protective shaped body 7, a coefficient of thermal expansion which corresponds very largely to that of the metal material of the main body 1. Thermal stresses between the metallic main body 1 and the protective shaped body 7 surrounding this in the melt-contact surface region 2 can thus be minimized. On smaller surface regions or transitions, the ceramic adhesive layer 8 can also be used as sole coating or filling over the full area.

The main body 1 preferably consists of an iron-based material, in particular a cast steel material as is known per se for metallic main bodys of foundry components, i.e. it is possible to use an iron-based or steel-based metal material customary for this purpose.

The protective shaped body 7 can, depending on requirement and the particular use, be prefabricated as tailored, one-piece, rigid shaped body from suitable shaped body material by being formed by a plurality of rigid, prefabricated plate elements which consist of a plate material suitable for the present purpose and are directly arranged on the main body 1 of the foundry component or, as an alternative, firstly assembled to give the shaped body and then arranged jointly as uniform shaped body on the melt-contact surface region 2 of the main body 1. Any joint gaps or interfaces and/or transitions between the plate elements can be closed or sealed using, for example, the same ceramic adhesive material as that of the ceramic adhesive layer 8, or as an alternative using a different heat-resistant ceramic adhesive material. The protective shaped body 7 has, in typical working examples, a thickness in the range from 2 mm to 25 mm.

When using the protective woven fabric body 5, this is preferably prefabricated in a tailored manner as flexible woven fabric body from the respective conventional woven fabric material which is casting temperature resistant, e.g. an $Al_2O_3$ woven fabric material, and placed on the main body 1 in the melt-contact surface region 2 thereof. As soon as the flexible woven fabric body comes into contact with the metal melt, e.g. when the main body 1 is dipped into the metal melt, it is pressed against the melt-contact surface region 2 by the pressure of the melt material and any enclosed air is displaced. The protective woven fabric body or $Al_2O_3$ protective woven fabric body 5 prevents penetration of the metal melt through to the metallic main body 1 and over the course of further use, typically after some days or weeks of contact with the melt material, transforms from the woven fabric body which is flexible and elastic when initially used into a brittle woven fabric body by a sintering effect.

When the nonwoven protective layer 6 is used as inner layer within the protective shaped body 7 as outer layer 4, the nonwoven protective layer 6, which is a soft and elastic layer, can if required be introduced with variable thickness into the anticorrosion layer structure 3. This makes it possible to compensate for different thermal expansion of the metallic main body 1 compared to the rigid, dense and rather brittle lining which is formed by the outer protective shaped body 7.

The anticorrosion layer structure 3 is, due to the fact that it is not adhesively bonded or positively locked over the entire area to the metallic main body 1 to be protected, relatively insensitive to mechanical damage compared to conventional adhesively bonded or positively locked coatings, and any damage can readily be kept local. In addition, the anticorrosion layer structure 3 has, for this reason, a significantly better thermal expansion tolerance, i.e. the occurrence of mechanical stresses in the anticorrosion layer structure 3 due to thermal expansion effects of the metallic main body 1 can be avoided or in any case significantly reduced compared to conventional adhesively bonded or positively locked coatings.

Even though the metallic main body 1 is provided only partially and on the outside with the anticorrosion layer structure 3 in the working examples shown, it goes without saying that in other embodiments the metallic main body 1 can, if required, be provided not only partially but over the full area on its total outer side and/or partially or completely on interior surface regions which come into contact with the melt material with the anticorrosion layer structure 3.

What is claimed is:

1. A foundry component for an apparatus for casting or handling a metal melt, the foundry component comprising:
   a metallic main body which is provided in a melt-contact surface region with an anticorrosion layer structure composed of one or more superposed layers, wherein the anticorrosion layer structure comprises:
   a plurality of layers, wherein at least two of said layers are selected as two different members of the group consisting of:
   a protective woven fabric body prefabricated as a flexible woven fabric body from a woven fabric material which is casting temperature resistant,
   a nonwoven protective layer prefabricated as a pliable nonwoven layer from a fiber nonwoven material or a fiber paper material which is casting temperature resistant, and
   a protective shaped body prefabricated as a rigid shaped body from a shaped body material which is casting temperature resistant, wherein
   the foundry component is one or part of: a casting fitting, a casting vessel, a melt furnace component, and a melt transport component,
   the anticorrosion layer structure is provided only in the melt-contact surface region, and
   the anticorrosion layer structure has a ceramic adhesive layer as an additional, innermost layer.

2. The foundry component according to claim 1, wherein the woven fabric material which is casting temperature resistant is a material based on $Al_2O_3$.

3. The foundry component according to claim 1, wherein the fiber nonwoven or fiber paper material which is casting temperature resistant is a material based on $Al_2O_3$.

4. The foundry component according to claim 1, wherein the shaped body material which is casting temperature resistant is a material based on $Al_2O_3$.

5. The foundry component according to claim 1, wherein the anticorrosion layer structure is multi-ply and comprises at least one further layer which differs from the first-named layer and is selected from the group consisting of: the protective woven fabric body, the nonwoven protective layer, the protective shaped body and the ceramic adhesive layer which is casting temperature resistant.

6. The foundry component according to claim 5, wherein the anticorrosion layer structure has the protective woven fabric body as an outer layer and the nonwoven protective layer as an inner layer.

7. The foundry component according to claim 5, wherein the anticorrosion layer structure is at least three-ply and has the protective shaped body or the protective woven fabric body as an outer layer, the ceramic adhesive layer as an innermost layer and the nonwoven protective layer as an intermediate layer between the ceramic adhesive layer and the protective shaped body or the protective woven fabric body.

8. The foundry component according to claim 5, wherein the ceramic adhesive layer is made of a ceramic adhesive material which is based on $Al_2O_3$ and is casting temperature resistant.

9. The foundry component according to claim 1, wherein the protective woven fabric body has a thickness in the range from 0.8 mm to 3 mm.

10. The foundry component according to claim 1, wherein the nonwoven protective layer has a thickness in the range from 0.5 mm to 5 mm.

11. The foundry component according to claim 1, wherein the protective shaped body has a thickness in the range from 2 mm to 25 mm.

12. The foundry component according to claim 1, wherein the main body is made of an iron-based material.

13. The foundry component according to claim 12, wherein the main body is made of a cast steel material.

14. The foundry component according to claim 1, wherein the foundry component is a component of a metal pressure casting machine.

15. A foundry component for an apparatus for casting or handling a metal melt, the foundry component comprising:
a metallic main body which is provided in a melt-contact surface region with an anticorrosion layer structure composed of superposed layers,
wherein the anticorrosion layer structure comprises as one of a plurality of layers, a protective woven fabric body prefabricated as a flexible woven fabric body from a woven fabric material which is casting temperature resistant or a nonwoven protective layer prefabricated as a pliable nonwoven layer from a fiber nonwoven material or a fiber paper material which is casting temperature resistant or a protective shaped body prefabricated as a rigid shaped body from a shaped body material which is casting temperature resistant,
wherein the anticorrosion layer structure is multi-ply and comprises at least one further layer, which differs from the one layer, and is selected from the group consisting of: the protective woven fabric body, the nonwoven protective layer, the protective shaped body and a ceramic adhesive layer which is casting temperature resistant, and
wherein
(i) the anticorrosion layer structure has the ceramic adhesive layer as an innermost layer, or
(ii) the anticorrosion layer structure has the protective woven fabric body as an outer layer and the nonwoven protective layer as an inner layer, or
(iii) the anticorrosion layer structure is at least three-ply and has the protective shaped body or the protective woven fabric body as an outer layer, the ceramic adhesive layer as an innermost layer and the nonwoven protective layer as an intermediate layer between the ceramic adhesive layer and the protective shaped body or the protective woven fabric body, wherein
the foundry component is one or part of: a casting fitting, a casting vessel, a melt furnace component, and a melt transport component.

16. The foundry component according to claim 15, wherein
the woven fabric material which is casting temperature resistant is a material based on $Al_2O_3$.

17. The foundry component according to claim 15, wherein
the fiber nonwoven or fiber paper material which is casting temperature resistant is a material based on $Al_2O_3$.

18. The foundry component according to claim 15, wherein the shaped body material which is casting temperature resistant is a material based on $Al_2O_3$.

19. The foundry component according to claim 15, wherein
the anticorrosion layer structure is multi-ply and comprises at least one further layer which differs from the first-named layer and is selected from the group consisting of: the protective woven fabric body, the nonwoven protective layer, the protective shaped body and the ceramic adhesive layer which is casting temperature resistant.

20. The foundry component according to claim 19, wherein the anticorrosion layer structure has a ceramic adhesive layer as an additional, innermost layer.

* * * * *